(12) United States Patent
Magee

(10) Patent No.: US 9,766,153 B2
(45) Date of Patent: Sep. 19, 2017

(54) MEASURING VEHICLE DRAG IN A WIND TUNNEL

(71) Applicant: Garth L. Magee, Hawthorne, CA (US)

(72) Inventor: Garth L. Magee, Hawthorne, CA (US)

( * ) Notice: Subject to any disclaimer, the term of this patent is extended or adjusted under 35 U.S.C. 154(b) by 451 days.

(21) Appl. No.: 14/294,505

(22) Filed: Jun. 3, 2014

(65) Prior Publication Data

US 2015/0346051 A1    Dec. 3, 2015

(51) Int. Cl.
*G01M 9/06*     (2006.01)
*G01M 17/007*     (2006.01)

(52) U.S. Cl.
CPC ........ *G01M 9/062* (2013.01); *G01M 17/0074* (2013.01); *G01M 17/0076* (2013.01)

(58) Field of Classification Search
CPC .......... G01L 5/28; G01L 5/282; G01M 9/062; G01M 17/0074; G01M 17/0076
USPC ............ 73/123, 125, 147, 1.79, 118.01, 124, 73/126–128, 865.9
See application file for complete search history.

(56) References Cited

U.S. PATENT DOCUMENTS

| | | | |
|---|---|---|---|
| 7,013,704 B2 * | 3/2006 | Kusters | G01M 17/0072 |
| | | | 702/104 |
| 7,360,443 B2 | 4/2008 | Kerschbaum et al. | |
| 7,614,291 B2 | 11/2009 | Ebeling et al. | |
| 8,042,386 B2 | 10/2011 | Kata et al. | |
| 8,272,258 B2 | 9/2012 | Estrada | |
| 8,607,626 B2 | 12/2013 | Litz et al. | |
| 8,788,116 B2 | 7/2014 | Litz | |
| 2011/0185803 A1 * | 8/2011 | Demajistre | B62J 99/00 |
| | | | 73/147 |

* cited by examiner

*Primary Examiner* — William Gilbert

(57) ABSTRACT

A method and apparatus for measuring the propulsive power required to overcome drag forces on a vehicle mounted within a wind tunnel. The apparatus includes a running belt platform driven by a dynamometer and supporting the vehicle placed inside a wind tunnel and controlled by a closed-loop servo control system, which maintains the vehicle centered on the running belt under varying operating speeds and headwind conditions. The power dissipated in drag is measured as the power transferred through ground contact with the wheels of the vehicle.

25 Claims, 7 Drawing Sheets

-Reference Art-

MEASURING VEHICLE DRAG IN A WIND TUNNEL

BACKGROUND

Field

The present embodiment relates to the measurement of propulsive power delivered by vehicles through the wheels while mounted inside a wind tunnel.

Description of Prior Art

Inherently characteristic of rotating vehicle wheels, and particularly of spoked wheels, aerodynamic resistance, or parasitic drag, is an unwanted source of energy loss in propelling a vehicle. Parasitic drag on a wheel includes viscous drag components of form (or pressure) drag and frictional drag. Form drag on a wheel generally arises from the circular profile of a wheel moving though air at the velocity of the vehicle. The displacement of air around a moving object creates a difference in pressure between the forward and trailing surfaces, resulting in a drag force that is highly dependent on the relative wind speed acting thereon. Streamlining the wheel surfaces can reduce the pressure differential, reducing form drag.

Frictional drag forces also depend on the speed of wind impinging exposed surfaces, and arise from the contact of air moving over surfaces. Both of these types of drag forces arise generally in proportion to the square of the relative wind speed, per the drag equation. Streamlined design profiles are generally employed to reduce both of these components of drag force.

The unique geometry of a wheel used on a vehicle includes motion both in translation and in rotation; the entire circular outline of the wheel translates at the vehicle speed, and the wheel rotates about the axle at a rate consistent with the vehicle speed. Form drag forces arising from the moving outline are apparent, as the translational motion of the wheel rim must displace air immediately in front of the wheel (and replace air immediately behind it). These form drag forces arising across the entire vertical profile of the wheel are therefore generally related to the velocity of the vehicle.

As the forward profile of a wheel facing the direction of vehicle motion is generally symmetric in shape, and as the circular outline of a wheel rim moves forward at the speed of the vehicle, these form drag forces are often considered uniformly distributed across the entire forward facing profile of a moving wheel (although streamlined cycle rims can affect this distribution somewhat). This uniform distribution of pressure force is generally considered centered on the forward vertical wheel profile, and thereby in direct opposition to the propulsive force applied at the axle, as illustrated in FIG. 9.

However, as will be shown, frictional drag forces are not uniformly distributed with elevation on the wheel, as they are not uniformly related to the speed of the moving outline of the wheel rim. Instead, frictional drag forces on the wheel surfaces are highly variable and depend on their elevation above the ground. Frictional drag must be considered separate from form drag forces, and can be more significant sources of overall drag on the wheel and, as will be shown, thereby on the vehicle.

Vehicles having wind-exposed wheels are particularly sensitive to external headwinds reducing propulsive efficiency. Drag force on exposed wheels increases more rapidly on upper wheel surfaces than on vehicle frame surfaces, causing a non-linear relation from rising wind speeds between net drag forces on vehicle frame surfaces versus net drag forces on vehicle wheel surfaces.

Since upper wheel surfaces are moving against the wind at more than the vehicle speed, the upper wheel drag forces contribute more and more of the total vehicle drag as external headwinds rise. Thus, as external headwinds rise, a greater fraction of the net vehicle drag is shifted from vehicle frame surfaces to upper wheel surfaces.

And these upper wheel drag forces must be overcome by a propulsive counterforce applied at the axle. Such propulsive counterforces suffer a mechanical disadvantage against the upper wheel drag forces, since each net force is applied about the same pivot point located at the bottom where the wheel is in stationary contact with the ground. This mechanical advantage that upper wheel drag forces have over propulsive counterforces further augments the effective vehicle drag that exposed wheels contribute under rising headwinds.

As a result of these magnified effects of upper wheel drag on resisting vehicle propulsion, a simple measure of net drag force on the entire vehicle is inadequate to properly account for the loss in vehicle propulsive efficiency under rising external headwinds. Hence, another method must be employed to measure the actual power output from a vehicle when exposed to headwinds.

Instrumentation commonly used to measure drag forces on vehicles mounted inside a wind tunnel have been designed primarily for use on aircraft, rather than terrestrial vehicles having wheels. Aircraft models are typically suspended on a pedestal mount, with instrumentation designed to measure the total force exerted on the pedestal when the model is subjected to wind-induced drag forces. By measuring the difference in force exerted on the pedestal mount between with and without the model supended thereon, the net drag force exerted on the model alone can be determined.

Instrumentation similar to that used on pedestals for aircraft models has also been adapted for use on terrestrial vehicles mounted inside wind tunnels. The total force exerted on the vehicle from drag is often measured as the net force exerted on the pedestal. From this measurement, and from the apparent speed and weight of the vehicle—which is often immobilized on a running floor that itself is mounted on a pedestal mount—the power dissipated in drag on the vehicle can be determined, absent other frictional losses. This power measurement is assumed to accurately reflect the vehicle internal propulsive power needed to overcome drag forces.

This assumption can be somewhat valid for vehicles with wheels that are entirely shielded from oncoming headwinds. However, vehicles with wind-exposed wheels are particularly sensitive to external headwinds reducing their propulsive efficiency. Wheel drag forces in particular, are greatly magnified against propulsive counterforces—especially when external headwinds are also present—causing substantial inaccuracies from using the direct force-measurement methods of determining overall vehicle drag. A simple measure of net drag force on the frame of the vehicle is inadequate to properly account for the loss in propulsive efficiency of the vehicle. Hence, another method must be employed to measure the actual power output of the vehicle when exposed to headwinds. Nevertheless, these direct force-measurement methods are still employed in the art.

For example, in U.S. Pat. No. 7,360,443 B2, U.S. Pat. No. 7,614,291 B2 and U.S. Pat. No. 8,272,258 B2, force-measuring means are used to directly measure forces parallel to the vehicle motion which act against one or more platforms upon which the vehicle is mounted inside the wind tunnel—the platforms being separated and isolated from the stationary environment. The platforms include the force measuring instrumentation, intended to accurately measure the total drag on the vehicle. However, this arrangement does not accurately reflect the propulsive counterforce needed to overcome drag forces on vehicles having headwind-exposed wheels.

And in patent EP 1 388 881 A1, a dynamometer is employed on the powered wheel of the vehicle, while employing a road-simulating moving belt beneath the vehicle in order to simulate air flow conditions under the vehicle while operating at speed. The arrangement is intended to mimic air flow road conditions for the purpose of emissions measurement from the vehicle. However, all wheels of the vehicle must be simultaneously coupled to the dynamometer in order to obtain an accurate measurement of the effective drag force on a vehicle. And in the arrangement of this art, the vehicle is immobilized on the dynamometer. In order to obtain an accurate measurement of the effective drag force, the vehicle must also instead remain necessarily unconstrained in the direction of vehicle motion, able to freely self-propel on the dynamometer as it does while driving on an actual road.

Finally, in U.S. Pat. No. 7,360,443 B2 and U.S. Pat. No. 7,614,291 B2, the vehicle is also immobilized, being fixed to the supporting weighing plate.

SUMMARY

An embodiment comprises a running belt platform driven by a dynamometer to be placed inside a wind tunnel, and used to measure the propulsive power required to overcome net drag forces on a vehicle mounted thereon. The running belt is driven by a universal dynamometer and controlled by a closed-loop servo control system, which maintains the vehicle centered on the running belt under varying operating speeds and headwind conditions.

DESCRIPTION OF THE DRAWINGS

While one or more aspects pertain to most wheeled vehicles not otherwise having fully shielded wheels that are completely protected from oncoming headwinds, the embodiments can be best understood by referring to the following figures.

DESCRIPTION OF WHEEL DRAG MECHANICS

As mentioned, drag force on exposed wheels increases more rapidly on upper wheel surfaces than on vehicle frame surfaces, causing a non-linear relation from rising wind speeds between net drag forces on vehicle frame surfaces versus net drag forces on vehicle wheel surfaces. Thus, vehicles having wind-exposed wheels are particularly sensitive to external headwinds reducing propulsive efficiency. As a result, there exists a need for another method to measure the actual power output from a vehicle when exposed to headwinds.

Because of this rising dominance of wheel drag in rising headwinds,—due to the non-linear relation from rising wind speeds between net drag forces on vehicle frame surfaces versus net drag forces on vehicle wheel surfaces—a discussion of the wheel drag mechanics central to this non-linear relationship is presented herein. The upper wheel fairing is described below as a simple solution for reducing vehicle drag in rising headwinds, and is presented herein as background for the present embodiment.

Figure 5:
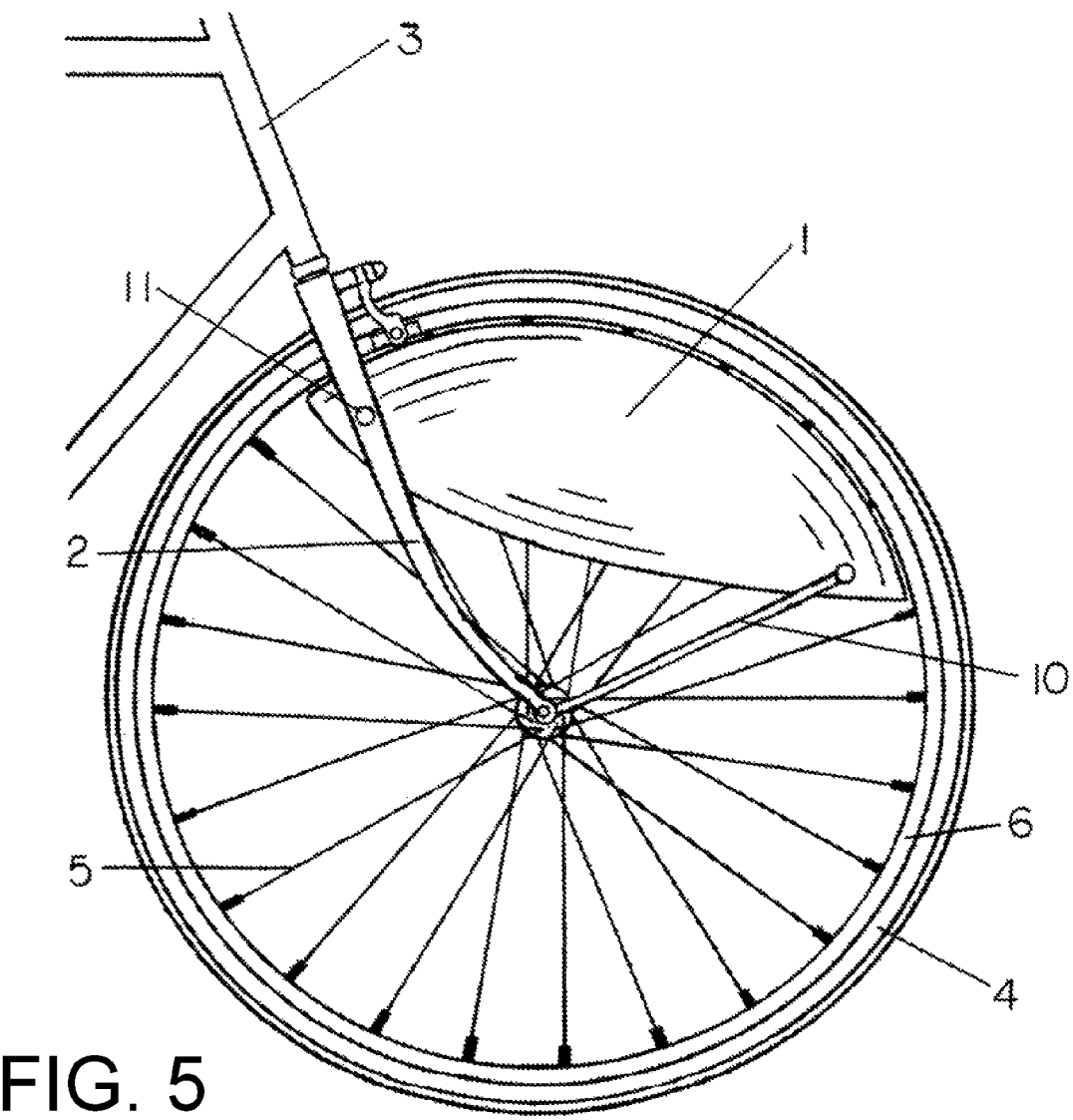
FIG. 5 is a front cycle wheel assembly, as typically found on a bicycle or motorcycle, where a fairing is attached and positioned as shown to each interior side of the fork assembly, thereby shielding the upper- and front-most surfaces of the spoked wheel from oncoming headwinds.

The shielding provided by fairing 1 in FIG. 5 is particularly effective since aerodynamic forces exerted upon exposed vehicle surfaces are generally proportional to the square of the effective wind speed impinging thereon. Moreover, the power required to overcome these drag forces is generally proportional to the cube of the effective wind speed. Thus, it can be shown that the additional power required to overcome these drag forces in propelling a vehicle twice as fast over a fixed distance, in half the time, increases by a factor of eight. And since this power requirement is analogous to rider effort—in the case of a bicycle rider—it becomes critical to shield the most critical drag-inducing surfaces on a vehicle from oncoming headwinds.

Figure 6:
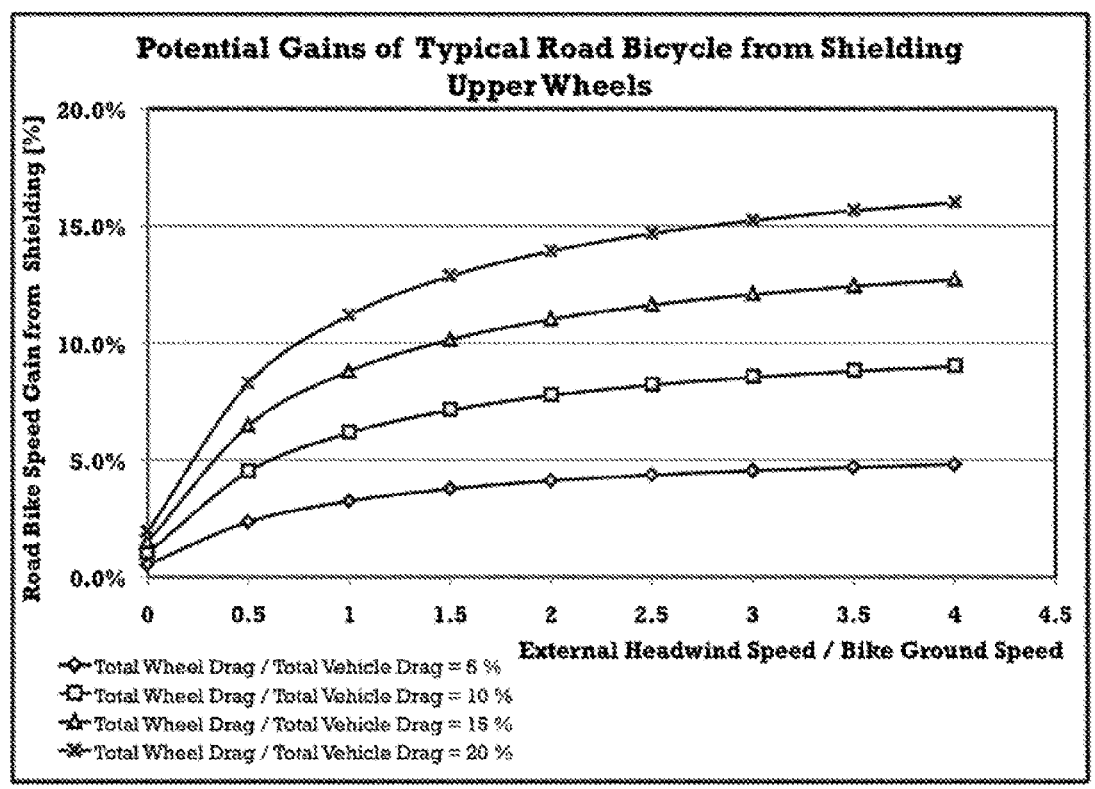
FIG. 6 is a series of curves showing the results of an analysis of the drag mechanics on a bicycle with shielded upper wheels, indicating that a bicycle with shielded upper wheels is faster when facing headwinds. Several curves are displayed, as examples of different bicycles each having a different proportion of wheel-drag to total-vehicle-drag.

FIG. 6 shows the results of an analysis of the drag mechanics on a bicycle with shielded upper wheels. The curves indicate that a bicycle with shielded upper wheels is faster when facing headwinds. Moreover, the gains in propulsive efficiency are shown to quickly increase in only a modest headwind, but continue to rise as headwinds increase further. This non-linear relationship between upper wheel drag and total vehicle drag under increasing headwinds, causes traditional wind tunnel drag measurement methods to become increasingly inaccurate as the tested vehicle is exposed to higher effective headwind speeds. The reasons for this nonlinear relationship become apparent from an examination of the drag mechanics on vehicle wheels.

In any wheel used on a vehicle, and in the absence of any external headwinds, the effective horizontal wind speed at a point on the wheel at the height of the axle is equal to the ground speed of the vehicle. Indeed, the effective headwind speed upon any point of the rotating wheel depends on that point's current position with respect to the direction of motion of the vehicle.

Notably, a point on the moving wheel coming into direct contact with the ground is necessarily momentarily stationary, and therefore is not exposed to any relative wind speed, regardless of the speed of the vehicle. While the ground contact point can be rotating, it is not translating; the contact point is effectively stationary. And points on the wheel nearest the ground contact point are translating with only minimal forward speed. Hence, drag upon the surfaces of the wheel nearest the ground is generally negligible.

Contrarily, the topmost point of the wheel assembly (opposite the ground) is exposed to the highest relative wind speeds: generally at least twice that of the vehicle speed. And points nearest the top of the wheel are translating with forward speeds substantially exceeding the vehicle speed. Thus, drag upon the surfaces of the upper wheel can be quite substantial. Lower points on the wheel are exposed to lesser effective wind speeds, approaching a null effective wind speed—and thus negligible drag—for points nearest the ground.

Figure 9:
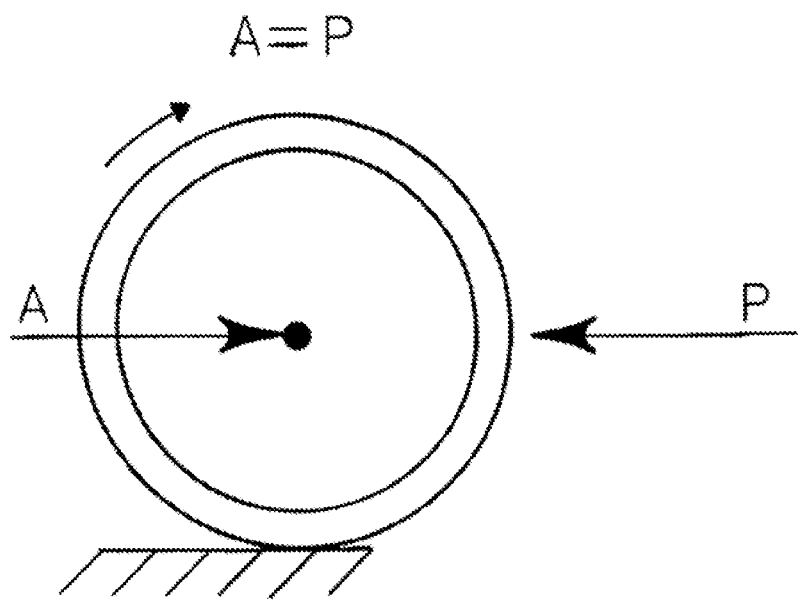
FIG. 9 (Prior Art) is a diagram of a wheel rolling on the ground representing typical prior art models, showing the net pressure drag force (P) exerted upon the forward wheel vertical profile—which moves at the speed of the vehicle—being generally centered near the axle of the wheel and balanced against the propulsive force (A) applied at the axle.
Figure 10:
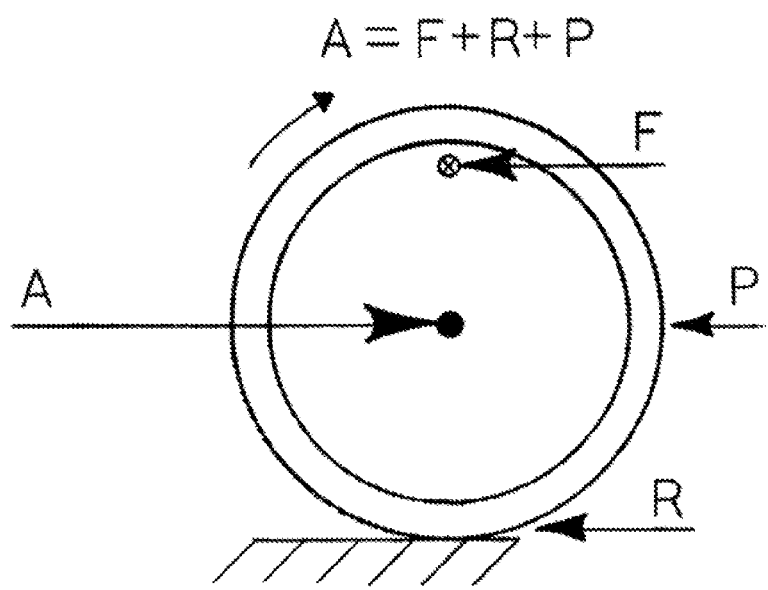
FIG. 10 is a diagram of a wheel rolling on the ground, showing the net friction drag force (F) upon the wheel surfaces—which move at different speeds depending on the elevation from the ground—being offset from the axle and generally centered near the top of the wheel. A ground reaction force (R)—arising due to the drag force being offset near the top of the wheel—is also shown. The force (A) applied at the axle needed to overcome the combination of drag forces (F+P) and reaction force (R) is also shown.

Importantly, due to the rotating geometry of the wheel, it can be shown that the effective combined frictional drag force exerted upon the wheel is typically centered in closer proximity to the top of the wheel, rather than centered closer to the axle as has been commonly assumed in many past analyses of total wheel drag forces. While the net pressure (or form) drag (P) force on the forwardly facing profile of the wheel is generally centered with elevation and directed near the axle on the wheel (as shown in FIG. 9), the net frictional drag force (F) upon the moving surfaces is generally offset to near the top of the wheel (as shown in FIG. 10).

Indeed, it is near the top of the wheel where the relative winds are both greatest in magnitude, and are generally oriented most directly opposed to the forward motion of rotating wheel surfaces. Moreover, in the absence of substantial external headwinds, the frictional drag exerted upon the lower wheel surfaces contributes relatively little to the net drag upon the wheel, especially when compared to the drag upon the upper surfaces. The combined horizontal drag forces (from pressure drag from headwinds deflected by both the leading and trailing wheel forwardly facing profiles, and from frictional drag from headwinds impinging upon the forwardly moving surfaces) are thus generally concentrated near the top of the wheel under typical operating conditions. Moreover, with the faster relative winds being directed against the uppermost wheel surfaces, total drag forces combine near the top to exert considerable retarding torque upon the wheel.

As mentioned, the horizontal drag forces are primarily due to both pressure drag forces generally distributed symmetrically across the forwardly facing vertical profiles of the wheel, and to winds in frictional contact with moving surfaces of the wheel. Pressure drag forces arise primarily from the displacement of air from around the advancing vertical profile of the wheel, whose circular outline moves at the speed at the vehicle. As discussed above, since the entire circular profile moves uniformly at the vehicle speed, the displacement of air from around the moving circular profile is generally uniformly distributed with elevation across the forwardly facing vertical profile of the wheel. Thus, these pressure drag forces (P, as shown in FIG. 9 and FIG. 10) are also generally evenly distributed with elevation across the entire forwardly facing vertical profile of the wheel, and centered near the axle. And these evenly distributed pressure drag forces arise generally in proportion only to the effective headwind speed of the vehicle.

Frictional drag forces (F, as shown FIG. 10), however, are concentrated near the top of the wheel where moving surfaces generally exceed vehicle speed—while the lower wheel surfaces move at less than the vehicle speed. Since drag forces are generally proportional to the square of the effective wind speed, it becomes apparent that with increasing wind speed, that these upper wheel frictional drag forces directed upon the moving surfaces increase much more rapidly than do pressure drag forces directed upon the forward profile of the wheel. Indeed, these friction drag forces generally arise in much greater proportion to an increasing effective headwind speed of the vehicle. Nevertheless, these increased frictional drag forces being directed on the upper wheel is only a partial factor contributing to augmented wheel drag forces being responsible for significantly retarded vehicle motion.

Significantly, both types of drag forces can be shown to exert moments of force pivoting about the point of ground contact. And as such, either type of drag force exerted upon the upper wheel retards vehicle motion considerably more than a similar force exerted upon a substantially lower surface of the wheel. Minimizing these upper wheel drag forces is therefore critical to improving propulsive efficiency of the vehicle.

Also important—and due to the rotating geometry of the wheel—it can be shown that the vehicle propulsive force on the wheel applied horizontally at the axle must substantially exceed the net opposing drag force exerted near the top of the wheel. These forces on a wheel are actually leveraged against each other, both pivoting about the same point—the point on the wheel which is in stationary contact with the ground—and which is constantly changing lateral position with wheel rotation. Indeed, with the geometry of a rolling wheel momentarily pivoting about the stationary point of ground contact, the lateral drag and propulsive forces each exert opposing moments of force on the wheel centered about this same point in contact with the ground.

Furthermore, unless the wheel is accelerating, the net torque from these combined moments on the wheel must be null: The propulsive moment generated on the wheel from the applied force at the axle must substantially equal the opposing moment from drag forces centered near the top of the wheel (absent other resistive forces, such as bearing friction, etc.). And the propulsive moment generated from the applied force at the axle has a much shorter moment arm (equal to the wheel radius) than the opposing moment from the net drag force centered near the top of the wheel (with a moment arm substantially exceeding the wheel radius)—since both moment arms are pivoting about the same stationary ground contact point. Thus, for these opposing moments to precisely counterbalance each other, the propulsive force applied at the axle—with the shorter moment arm—must substantially exceed the net drag force near the top of the wheel.

In this way, the horizontal drag forces exerted upon the upper surfaces of the wheel are leveraged against opposing and substantially magnified forces at the axle. Hence, a relatively small frictional drag force centered near the top of the wheel can have a relatively high impact on the propulsive counterforce required at the axle. Shielding these upper wheel surfaces can divert much of these headwind-induced drag forces directly onto the vehicle body, thereby negating much of the retarding force amplification effects due to the pivoting wheel geometry.

Moreover, since the propulsive force applied at the axle exceeds the combined upper wheel drag forces, a lateral reaction force (R, as shown in FIG. 10) upon the wheel is necessarily developed at the ground contact point, countering the combined unbalanced propulsive and drag forces on the wheel: Unless the wheel is accelerating, the reaction force at the ground, together with the upper wheel net drag forces (F+P), combine (A=F+R+P, as shown in FIG. 10) to countervail the lateral propulsive force (A) applied at the axle. This reaction force is transmitted to the wheel through frictional contact with the ground. In this way, an upper wheel drag force is further magnified against the axle. For these multiple reasons, it becomes crucial to shield the upper wheel surfaces from exposure to headwinds.

Given that the propulsive force (A) applied at the axle must overcome both the net wheel drag forces (F+P) and the countervailing lower reaction force (R) transmitted through the ground contact point, it can be shown that the net drag force upon the upper wheel can oppose vehicle motion with nearly twice the sensitivity as an equivalent drag force upon the static frame of the vehicle. Hence, shifting the impact of upper wheel drag forces to the static frame can significantly improve the propulsive efficiency of the vehicle.

Furthermore, as drag forces generally increase in proportion to the square of the effective wind speed, the more highly sensitive upper wheel drag forces increase far more rapidly with increasing headwind speeds than do vehicle frame drag forces. Thus, as the vehicle speed increases, upper wheel drag forces rapidly become an increasing component of the total drag forces retarding vehicle motion.

And given the greater sensitivity of speed-dependent upper wheel drag forces—as compared against vehicle frame drag forces—to the retarding of vehicle motion, considerable effort should first be given to minimizing upper wheel drag forces. And shielding the faster-moving uppermost surfaces of the wheel assembly from oncoming headwinds, by using the smallest effective fairing assembly, is an effective means to minimize upper wheel drag forces.

Contrarily, drag forces on the lower wheel generally oppose vehicle motion with reduced sensitivity compared to equivalent drag forces on the static frame of the vehicle. Propulsive forces applied at the axle are levered against lower wheel drag forces, magnifying their impact against these lower wheel forces. Shielding lower wheel surfaces can generally negate this mechanical advantage, and can actually increase overall drag on the vehicle.

Moreover, as discussed above, headwinds on the static frame generally exceed the speed of winds impinging the lower surfaces of the wheel. Hence, frictional drag forces on the lower wheel surfaces are greatly reduced. Thus, it is generally counterproductive to shield the wheel below the level of the axle. Drag on a vehicle is generally minimized with upper wheel surfaces shielded from headwinds and with lower wheel surfaces exposed to headwinds.

Wheel drag sensitivity to retarding vehicle motion becomes even more significant in the presence of external headwinds. With external headwinds, the effective wind speed impinging the critical upper wheel surfaces can well exceed twice the vehicle speed. Shielding protects the upper wheel surfaces both from external headwinds, and from headwinds due solely to vehicle motion.

Indeed, wheel surfaces covered by the shield are exposed to winds due solely to wheel rotation; headwinds are deflected. The effective drag winds beneath the shield are generally directed tangentially to rotating wheel surfaces, and vary in proportion to radial distance from the axle, reaching a maximum speed at the wheel rim equal to the vehicle speed, regardless of external headwinds. Since drag forces vary generally in proportion to the square of the wind speed, the frictional drag forces are considerably reduced on shielded upper wheel surfaces. Using these wind shields, shielded wheel surfaces are exposed to substantially reduced effective wind speeds—and to generally much less than half of the drag forces without shielding.

Diminished drag forces from external headwinds impinging the slower moving lower surfaces of a rolling wheel generally oppose wheel motion with much less retarding torque than drag forces from winds impinging the faster upper surfaces. Indeed, tests demonstrate that with upper shields installed on a suspended bicycle wheel, the wheel will spin naturally in the forward direction when exposed to headwinds. Without the shields installed, the same wheel remains stationary when exposed to headwinds, regardless of the speed of the headwind. And an unshielded spinning wheel will tend to stop spinning when suddenly exposed to a headwind. This simple test demonstrates that by minimally shielding only the upper wheel surfaces from external headwinds, the overall drag upon the rotating wheel can be substantially reduced.

Furthermore, as external headwinds upon a forwardly rotating vehicle wheel add relatively little frictional drag to the lower wheel surfaces—which move forward at less than the vehicle speed—but add far more significant drag to the upper wheel surfaces, which move forward faster than the vehicle speed and which can more significantly retard vehicle motion, shielding the upper wheel surfaces against headwinds is particularly beneficial. Since drag forces upon the wheel are generally proportional to the square of the effective wind speed thereon, and the additional drag on the wheel—and thereby on the vehicle—increases rapidly with headwinds, shielding these upper surfaces greatly reduces the power required to propel the vehicle. Moreover, the relative effectiveness of shielding upper wheel surfaces generally increases with increasing headwinds.

Figure 7:
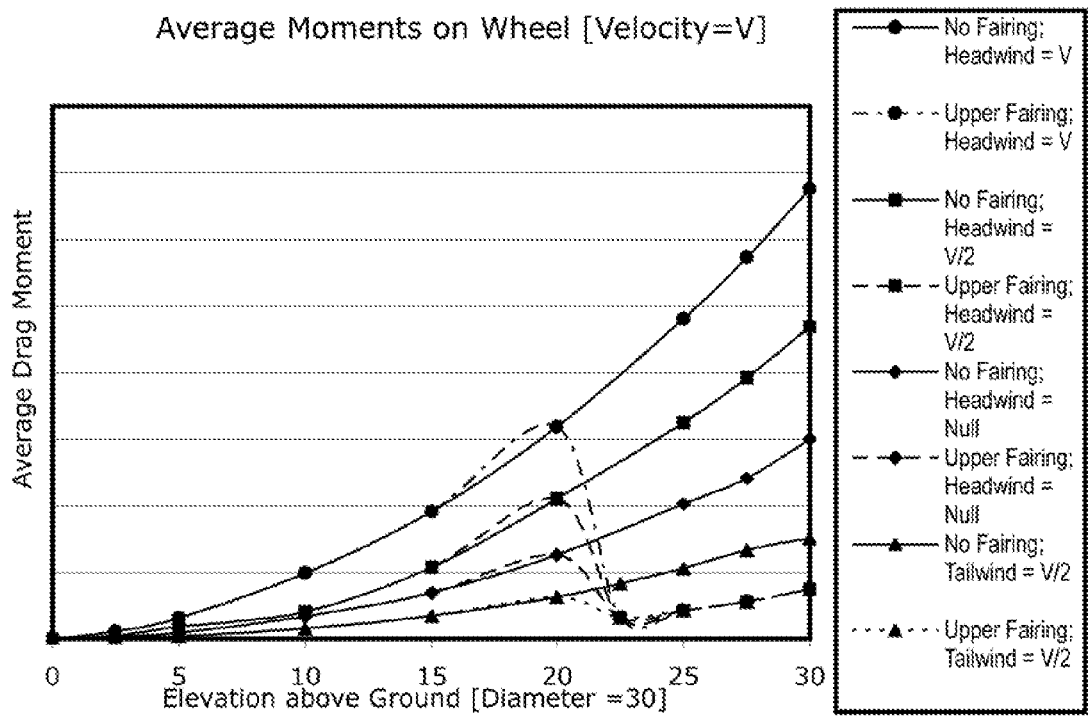
FIG. 7 shows a plot of calculated average moments—about the ground contact point—of drag force, that are exerted upon rotating wheel surfaces as a function of the elevation above the ground. The relative drag forces are determined from calculated wind vectors for the rotating surfaces on a wheel moving at a constant speed of V, and plotted for several different wind and wheel-surface shielding conditions. Specifically, relative magnitudes in average drag moments about the ground contact point as a function of elevation are plotted, for eight conditions: comparing with (dashed lines) and without (solid lines) shielding covering the upper third of wheel surfaces, for tailwinds equal to half the vehicle speed; for null headwinds; for headwinds equal to half the vehicle speed; and for headwinds equal to the vehicle speed. The rising solid curves plotted show the highest moments to be near the top of the wheel, while the dashed curves show the effect of the upper shield in substantially reducing the average drag moments on the rotating wheel.
Figure 8:
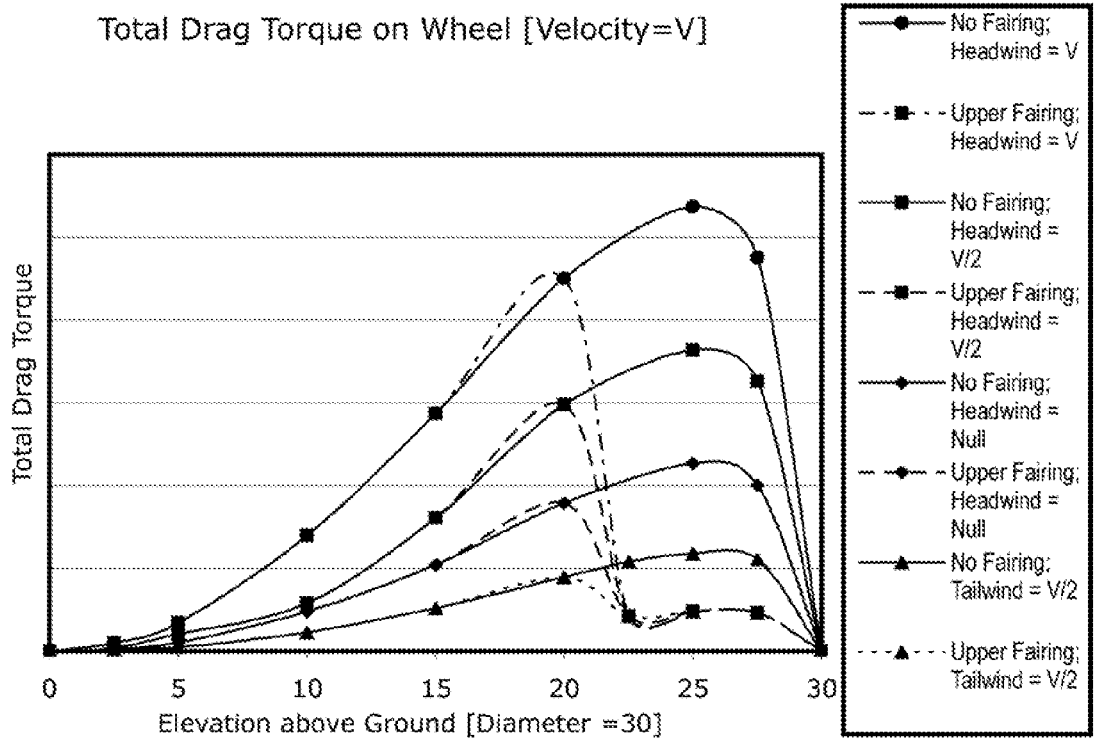
FIG. 8 shows a plot of calculated relative drag torque exerted upon rotating wheel surfaces as a function of elevation above the ground. The relative total drag torques are determined from the calculated average moments in combination with the chord length at various elevations on a wheel moving at a constant speed of V, for several different wind and wheel-surface shielding conditions. Relative magnitudes in total drag torque about the ground contact point as a function of elevation are plotted for eight conditions: comparing with (dashed lines) and without (solid lines) shielding covering the upper third of wheel surfaces, for tailwinds equal to half the vehicle speed; for null headwinds; for headwinds equal to half the vehicle speed; and for headwinds equal to the vehicle speed. The areas under the plotted curves represent the total torque from frictional drag on wheel surfaces. Comparing the differences in area under the plotted curves reveals the general trend of the upper shield to substantially reduce the total drag torque on the rotating wheel.

An examination of the retarding wind vectors on a rotating wheel can reveal the large magnitude of drag retarding moments upon the uppermost wheel surfaces, relative to the lower wheel surfaces. And an estimate of the frictional drag torque on the wheel can be determined by first calculating the average moments due to drag force vectors at various points—all pivoting about the ground contact point—on the wheel (results shown plotted in FIG. 7), and then summing these moments at various wheel elevations above the ground and plotting the results (FIG. 8). The area under the resulting curve (shown in FIG. 8 as a series of curves representing various headwind conditions) then represents the total frictional drag (absent profile drag) torque upon the wheel.

In order to determine the relationship between this torque and elevation on the wheel, the magnitudes of the drag wind vectors that are orthogonal to their corresponding moment arms pivoting about the point of ground contact must first be determined. These orthogonal vector components can be squared and then multiplied by the length of their corresponding moment arms, in order to determine the relative moments due to drag at various points along the wheel rim.

The orthogonal components of these wind vectors tend to increase linearly with elevation for points on the rim of the wheel, and also for points along the vertical mid-line of the wheel. Calculating the moments along the vertical mid-line of the wheel can yield the minimum relative drag moments at each elevation. Calculating an average of the maximum drag moment at the rim combined with the minimum drag moment along the mid-line can then yield the approximate average drag moment exerted at each elevation upon the wheel. Multiplying this average drag moment by the horizontal rim-to-rim chord length can yield an estimate of the drag torque exerted upon the wheel at each elevation level (FIG. 8). These calculations are simply determined from the geometry of the rotating wheel; the object of this analysis is to determine the likely relative magnitudes of drag torques upon the wheel at various elevations.

From the resulting plots (FIG. 8), it can be estimated that the uppermost approximate one-third section of the wheel likely contributes most of the overall drag torque upon the wheel. Thus, by shielding this upper section from headwinds, drag torque can be considerably reduced. With upper-wheel shielding, as noted above, the relative winds beneath the shield are due mostly to wheel rotation, and are generally directed tangentially to the wheel. The resulting drag torque under the shielded sections can then be determined as above, and compared with the unshielded drag torque for similar headwind conditions.

These calculations—generally confirmed by tests—indicate a substantial reduction in retarding drag torque upon the shielded upper wheel surfaces. In the absence of external headwinds, the plots of FIG. 8 indicate that shielding the uppermost approximate one-third section of the wheel can reduce the drag torque of this section considerably, by as much as 75 percent. Moreover, repeating calculations and testing with an external headwind equal to the vehicle speed indicates that upper wheel shielding can reduce the comparative upper wheel drag torque of this section by still more, perhaps by as much as 90 percent. Hence, the potential effectiveness of shielding upper wheel surfaces can be significant, especially with surfaces having higher drag sensitivities, such as wheel spoke surfaces.

As discussed above, since upper wheel drag forces are leveraged against the axle—thereby magnifying the propulsive counterforce required at the axle—an increase in drag force on the wheels generally retards vehicle motion much more rapidly than does an increase in other vehicle drag forces. And while under external headwind conditions, the total drag on a vehicle with wheels exposed directly to headwinds increases still more rapidly with increasing vehicle speed.

Shielding upper wheel surfaces effectively lowers the elevation of the point on the wheel where the effective net drag force is exerted, thereby diminishing the magnifying effect of the propulsive counterforce required at the axle, as discussed above. As a result, the reduction in drag force upon the vehicle achieved by shielding the upper wheel surfaces is comparatively even more significant with increasing external headwinds. Shielding these upper wheel surfaces can thereby improve relative vehicle propulsion efficiency under headwinds by an even greater margin than under null wind conditions.

Moreover, shielding these upper wheel surfaces can be particularly beneficial to spoked wheels, as round spokes can have drag sensitivities many times greater than that of more streamlined surfaces. As round spokes—in some configurations—can have drag coefficients ranging from one to two orders of magnitude greater than corresponding smooth, streamlined surfaces, shielding the spokes of the upper wheel from external wind becomes particularly crucial in reducing overall drag upon the wheel.

Accordingly—given these multiple factors—a relatively small streamlined fairing attached to the vehicle structure and oriented to shield the upper surfaces of the wheel assembly from oncoming headwinds substantially reduces drag upon the wheel, while minimizing total drag upon the vehicle. Consequently, an embodiment includes the addition of such a fairing to any wheeled vehicle—including vehicles having spoked wheels, where the potential drag reduction can be even more significant.

The addition of such minimal fairings to each side of a traditional spoked bicycle wheel, for example, reduces windage losses and improves propulsive efficiency of the bicycle, particularly at higher cycle speeds or in the presence of headwinds, while minimizing cycle instability due to crosswind forces. Since crosswinds are a significant factor restricting the use of larger wheel covers, minimizing the fairing size is also an important design consideration. And minimizing form drag induced by the forward-facing profile of the fairing also will influence the fairing design. The preferred fairing size will likely substantially cover the upper section of the exposed wheel, and be placed closely adjacent to the wheel surfaces, consistent with general use in bicycles. In heavier or powered cycles, design considerations may permit somewhat larger fairings, covering even more of the wheel surfaces.

As shielding upper wheel surfaces can reduce overall drag on the vehicle, while simultaneously augmenting the total frontal profile area of the vehicle exposed to headwinds, a natural design constraint emerges from these competing factors: Shields should be designed sufficiently streamlined and positioned sufficiently close to wheel surfaces to provide reduced overall vehicle drag. And as shielding effectiveness potentially increases under headwind conditions, shields designed with larger surface areas and larger frontal profiles may still provide reduced overall vehicle drag under headwind conditions, if not under null wind conditions. Thus, a range of design criteria may be applied to selecting the best configuration and arrangement of the fairing, and will likely depend on the particular application. In any particular application, however, the embodiment will include a combination of design factors discussed above that will provide a reduction in overall vehicle drag.

In a cycle application, for example, fairings positioned within the width of the fork assembly will likely provide the most streamlined design which both shields spokes from headwinds but also minimizes any additional form drag profile area to the vehicle frame assembly. In other applications, insufficient clearances may preclude positioning the fairings immediately adjacent to moving wheel surfaces. In such situations, headwinds may be sufficient in magnitude to cause a reduction in overall vehicle drag to justify the use of wider upper wheel fairings—positioned largely outside the width of the fork assembly—with extended forward profile areas.

Furthermore, from the previous analysis a consideration the drag torque curves wholly above the level of the axle, it becomes apparent that shielding the wheel is best centered about an elevation likely between 75 and 80 percent of the diameter of the wheel, or near the center of the area under the unshielded torque curve shown in FIG. 8. While drag forces are generally greatest in magnitude near the top of the wheel, the effective exposed topmost surface areas are much smaller, thereby limiting the magnitude of drag torques upon the uppermost surfaces of the wheel. Thus, the upper wheel fairing would best extend above and below this critical level (generally, between 75 and 80 percent of the diameter of the wheel) in order to optimally minimize drag upon the wheel. And as the surfaces forward of the axle are the first to be impacted by headwinds, shielding these surfaces is essential to deflecting headwinds from the rearward surfaces. Thus, the higher-sensitivity drag-inducing surfaces in the forward upper quadrant and centered about this critical elevation on the wheel generally need to be shielded for optimal minimization of drag. These higher-sensitivity drag-inducing surfaces generally centered about this critical elevation and extending to include those surfaces with higher drag-inducing sensitivities that are positioned mostly in the forward upper quadrant of the wheel, but likely also to include much of the wheel surfaces positioned in the rearward upper quadrant, are herein defined and later referred to as: major upper drag-inducing surfaces. And the critical level about which the major drag-inducing surfaces are generally centered in elevation is herein defined and later referred to as: critical elevation.

As discussed, the precise elevation about which the major upper drag-inducing surfaces are centered, as well as the precise extent to which surfaces in the forward quadrant and in the upper half of the wheel central structure are included in the major upper drag-inducing surfaces, will depend on the particular application and operating conditions. Certain wheel surfaces with higher drag sensitivities, such as wheel spokes, generally need to be shielded when positioned within the region of the major upper drag-inducing surfaces. Other surfaces such as smooth tire surfaces having lower drag sensitivities may also benefit from shielding if their surface areas are extensive, are positioned near the critical level in elevation, or are the primary upper wheel surfaces exposed to headwinds. In the example analysis of FIGS. 7 and 8, a uniform surface across the wheel having a constant drag-sensitivity was assumed. In any particular application, the unique combination of different wheel surfaces with differing drag sensitivities will determine the particular height of the critical elevation level about which the major upper drag-inducing surfaces are centered.

A similar analysis can be performed for form drag forces on the moving forward vertical profiles of the wheel rim or tire. The results obtained are generally similar in form, though may differ somewhat in magnitudes as the effective wind speeds on the moving profiles are generally lower on the upper wheel—equal to the vehicle speed—and will depend on the particular application, including the total area of the wheel forward profile exposed to headwinds, and to headwind and vehicle speeds. Nevertheless, the net pressure drag torque caused by the moving outline of the wheel is also centered above the level of the axle, and thereby merits consideration in determining the particular height of the critical elevation level, and in the ultimate configuration of the fairing.

Hence, the fairing shown in FIG. 5 is best configured to shield the uppermost and forward wheel surfaces, and to extend rearward to at least partially shield the forward profile of the trailing portion of the upper wheel rim, consistent with the further requirement to extend downward as much as practical to the level of the axle. As mentioned, crosswind considerations will also influence the ultimate configuration for a particular application.

In consideration of further embodiments described below, the operating principles described above will generally apply, and may be referred thereto.

DETAILED DESCRIPTION

Various embodiments are described below in detail, each having means providing a measurement of the propulsive power delivered by the vehicle through the wheels. By comparing the difference in power delivered under different headwind conditions, while operating the vehicle at the same speed when mounted inside a wind tunnel, the net propulsive power delivered to overcome drag on the vehicle can be determined.

Figure 1:
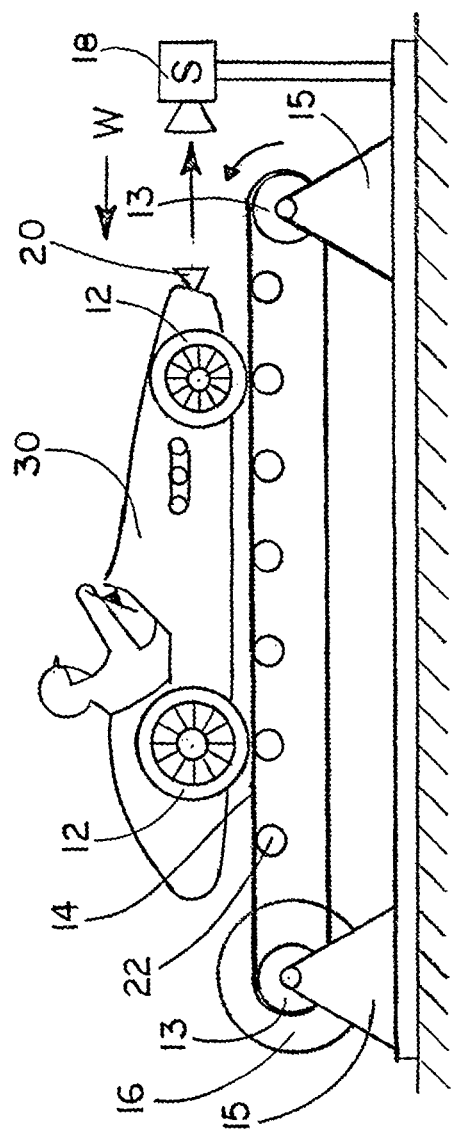
FIG. 1 is a comprises a running belt platform driven by a dynamometer to be placed inside a wind tunnel, and used to measure the propulsive power required to overcome net drag forces on a vehicle mounted thereon. The running belt is driven by a universal dynamometer and controlled by a closed-loop servo control system, which maintains the vehicle centered on the running belt under varying operating speeds and headwind conditions.

First Embodiment—FIG. 1

Figure 2:
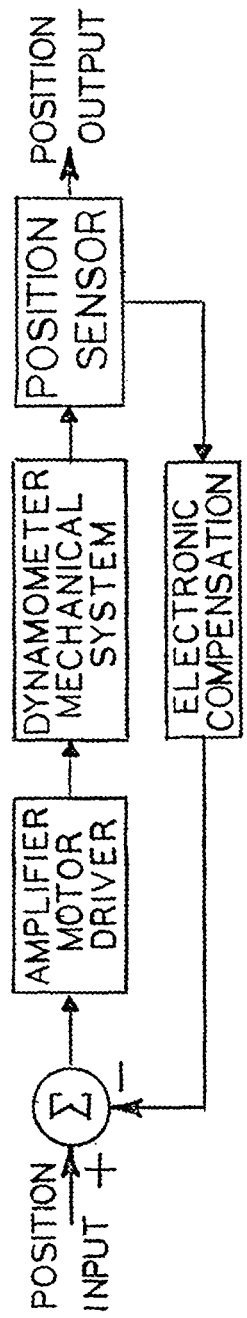
FIG. 2 is block diagram showing the closed-loop servo control system used to drive the dynamometer and maintain the vehicle well-centered on the running belt.

As shown in FIG. 1, a vehicle 30 having exposed wheels 12 is mounted on a running belt platform to be placed inside a wind tunnel. A running belt 14 suspended between drive rollers 13 mounted on floor supports 15 is driven by a universal dynamometer 16—capable of either motor or generator operation—whose speed is controlled by a closed-loop servo control system which is shown in FIG. 2.

An optical position sensor 18 focused on a target indicator 20 that is mounted on the vehicle 10 detects relative motion of the vehicle 10 in the longitudinal direction relative to the frame of the running belt 14. A signal from the optical sensor 18 is provided to the servo control system shown in FIG. 2, which in turn delivers a drive signal to the dynamometer 16.

An electronic position signal is typically provided as an input to the servo control system, thereby controlling the longitudinal position of the vehicle 30 on the running belt 14, regardless of either the operating speed of the vehicle 30 or the drag force upon the vehicle 30. The input position signal may be adjusted to optimally center the self-propelled vehicle 30 on the running belt 14.

The dynamic range of the entire control system is designed to include proper electronic compensation that will adequately maintain the vehicle 30 well-centered on the running belt 14 under varying drag loads and vehicle operating speeds. The electronic compensation is optimally adjusted for the operating speed, external loading, weight and configuration of the particular vehicle 30 being tested.

From a measure of the difference in power required to drive the dynamometer 16 to maintain the vehicle 30 well-centered under different external headwind conditions, the net power due to increased drag can be determined. Typically, measurement of the external drag loading on the vehicle 30 is compared between a baseline wind condition equal to the vehicle speed, and an external headwind condition exceeding the vehicle speed. Providing the baseline wind condition in the wind tunnel is equivalent to operating the vehicle 30 on the road under null wind conditions, and serves to provide a measure of baseline drag plus other frictional sources of propulsive resistance in the vehicle and test equipment. Then by increasing the external headwind while maintaining the same operating speed of the vehicle 30, the net increase in propulsive power due solely to increased drag can be measured. And from this differential power measurement, the net propulsive force required to overcome vehicle drag force due to the external headwind can also be deduced.

As the vehicle 10 is freely mounted on the running belt 14, a driver may be employed to steer the vehicle 10 in order to maintain directional stability. Safety restraints could be provided to engage the vehicle only under anomalous operating situations when the vehicle becomes in danger of leaving the platform.

A plurality of support rollers 22 are optimally positioned under the running belt 14 to support the weight of the vehicle 30 while maintaining a substantially planar contact surface with each vehicle wheel 12.

While an automobile is depicted in FIG. 1, other vehicle types could include two- and three-wheeled cycles. For example, this method could be used to test bicycles in wind tunnels in order to more accurately determine the effective drag on modern aerodynamic frames and wheels.

Although an optical position sensor is shown in FIG. 1, other types of position sensors such as sonic, magnetic or resistive could instead be utilized.

In consideration of further embodiments described below, the operating principles described above will generally apply, and may be referred thereto.

Figure 3:
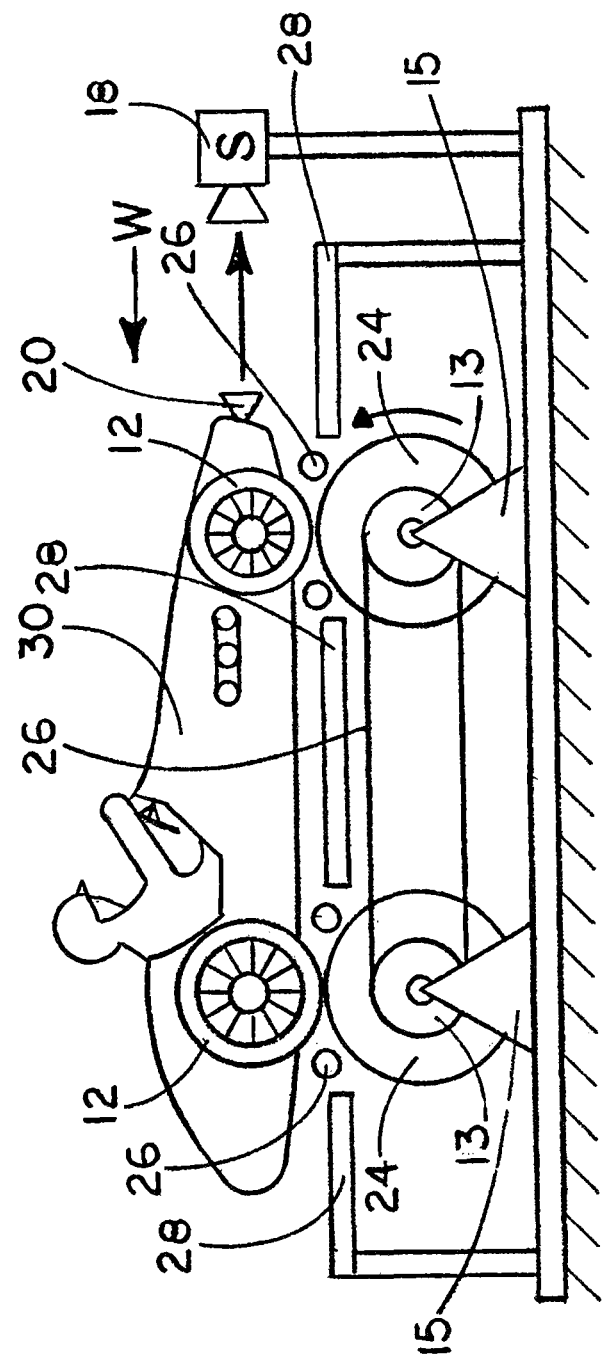
FIG. 3 is a comprises a roller assembly platform driven by a dynamometer to be placed inside a wind tunnel, and used to measure the propulsive power required to overcome net drag forces on a vehicle mounted thereon. The roller assembly is driven by a universal dynamometer and controlled by a closed-loop servo control system, which maintains the vehicle centered on the roller assembly under varying operating speeds and headwind conditions.

Second Embodiment—FIG. 3

As shown in FIG. 3, a vehicle 10 having exposed wheels 12 is instead mounted on a roller assembly platform to be placed inside a wind tunnel. The distance between the wheel rollers 24 of the roller assembly is adjusted to be approximately equal to the distance between the axles of the vehicle 10. At least one of the wheel rollers 24 is driven by a dynamometer 16 (not shown). Guide rollers 26 are placed adjacent to but apart from each wheel roller 24 for safety, though are not necessarily engaged with vehicle wheels 12 under testing conditions, since the closed-loop servo control system normally maintains the vehicle 10 well-centered on the wheel rollers 24. Safety plates 28 are placed in the spaces between the guide rollers 26, facilitating mounting the vehicle on the roller assembly platform. Each roller 24 of the roller assembly is synchronized for simultaneous rotation by direct coupling between the rollers 24 using a drive belt 26. Operation is similar to that of the embodiment shown in FIG. 1.

Figure 4:
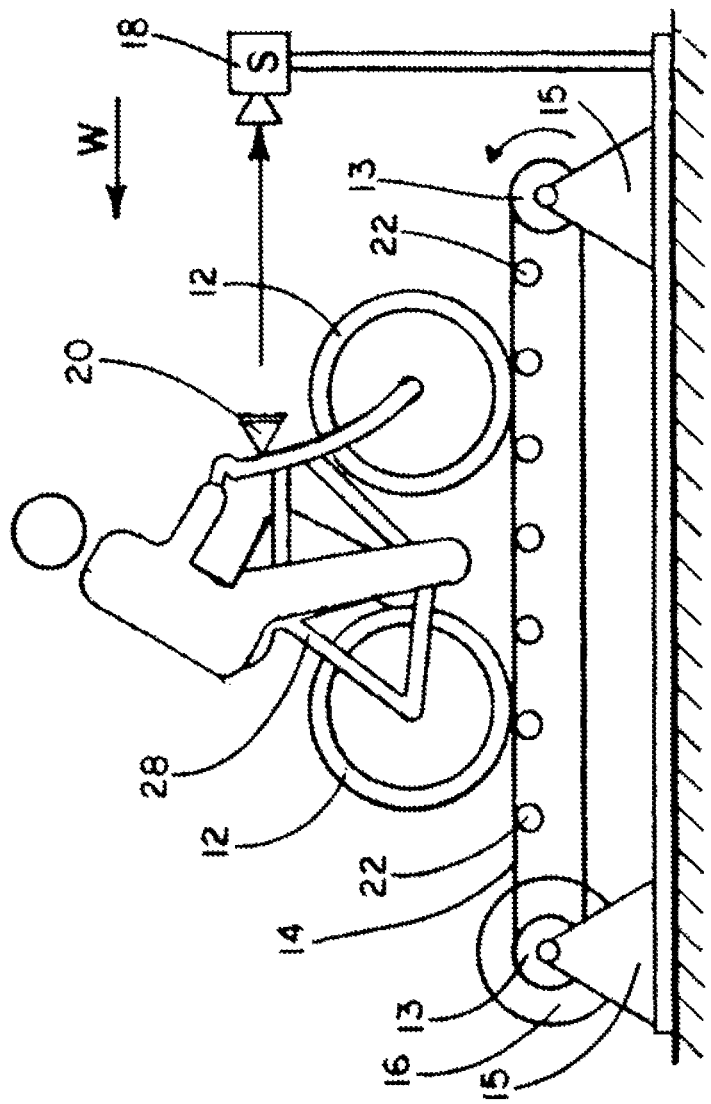
FIG. 4 is similar to FIG. 1, except having a bicycle replacing the automobile as the vehicle positioned on the running belt.

Third Embodiment—FIG. 4

As shown in FIG. 4, a bicycle with rider 28 having exposed wheels 12 is mounted on a running belt platform to be placed inside a wind tunnel. A running belt 14 suspended between drive rollers 13 mounted on floor supports 15 is driven by a universal dynamometer 16—capable of either motor or generator operation—whose speed is controlled by a closed-loop servo control system which is shown in FIG. 2. Operation of the platform is similar to that of the embodiment shown in FIG. 1.

Advantages

From the description above, a number of advantages of some embodiments become evident:

(a) The measurement of vehicle power delivered through the wheels can be used to yield a more accurate measure of vehicle propulsive power (and force) used to overcome drag.

(b) The measurement of vehicle power delivered through the wheels by using a relatively simple mechanical assembly mounted directly to the floor inside a wind tunnel can yield a more accurate measure of vehicle propulsive power (and force) used to overcome drag than the commonly used direct-force measurement methods employing a suspended platform with force sensors.

CONCLUSIONS, RAMIFICATIONS, AND SCOPE

Exposed wheels can generate considerable drag forces on a moving vehicle. These forces are directed principally near the top of the wheel, rather than being more evenly distributed across the entire profile of the wheel. Moreover, these upper-wheel drag forces are levered against the axle, thereby magnifying the counterforce required to propel the vehicle. As a result, a reduction in drag upon the upper wheel generally enhances propulsive efficiency significantly more than a corresponding drag reduction on other parts of the vehicle.

With the net drag forces being offset and directed near the top of the wheel, nearly equivalent countervailing reaction forces—also opposing vehicle motion—are necessarily transmitted to the wheel at the ground. These reaction forces necessitate augmented down-forces to be applied in higher speed vehicles, in order to maintain static frictional ground contact and, thereby, vehicle traction and directional stability. As wings and other means typically used to augment these down-forces in such vehicles can add significant drag, it becomes evident that substantial effort should be made to reduce the upper wheel drag forces on most high-speed vehicles.

As mentioned, exposed wheels can generate considerable drag forces on a moving vehicle, especially when external headwinds are present. These forces cause traditional direct-force vehicle frame-drag measurement methods to be inaccurate, especially for vehicles with wheels exposed to external headwinds. By instead measuring the vehicle power delivered through the wheels in a wind tunnel, a more accurate measure of vehicle propulsive power (and force) used to overcome drag can be determined.

While the embodiments shown illustrate application generally to automotive vehicles, the embodiments could be similarly applied other vehicle types to include two- and three-wheeled cycles. Other combinations could include closely-spaced, multiple drive rollers in contact with vehicle wheels, rather than a single drive roller as shown in FIG. 3. In addition, drive rollers shown in FIG. 3 could be driven independently and synchronized electronically, rather than using a mechanical belt to couple for synchronous rotation. Accordingly, the embodiments should not be limited to the specific examples illustrated and described above, but rather to the appended claims and their legal equivalents.

I claim:

1. An apparatus for determining propulsive efficiency of wheeled vehicles, comprising:
   a primary structure for determining power being delivered through wheels of a terrestrial vehicle, said vehicle having a plurality of vehicle wheels, whenever the vehicle is arranged upon the apparatus while being operated self-propelled for free longitudinal motion thereof;
   wherein the primary structure comprises a plurality of moveable surfaces supported thereon;
   the plurality of moveable surfaces being disposed wherein each said moveable surface is arranged to support a respective one of the plurality of vehicle wheels whenever the vehicle is arranged upon the apparatus in a vehicle test configuration and wherein each said moveable surface comprises a respective surface portion of a larger surface with said respective surface portion being in groundward contact with a respective one of the vehicle wheels;
   whenever the vehicle is arranged upon the apparatus in the vehicle test configuration, the vehicle test configuration comprising the vehicle being disposed substantially unrestrained for free longitudinal motion thereof upon the plurality of moveable surfaces while said disposed vehicle is both operated self-propelled at a test vehicle speed while also being exposed to a headwind wherein power used in moving said moveable surfaces is measured by a power measuring device;
   the plurality of moveable surfaces being further disposed wherein each said vehicle wheel is supported thereunder by one said moveable surface whenever the vehicle is arranged upon the apparatus in the vehicle test configuration;
   the plurality of moveable surfaces being further disposed wherein said moveable surfaces are disposed to provide for synchronous rotation of the vehicle wheels whenever the vehicle is arranged upon the apparatus in the vehicle test configuration;
   the plurality of moveable surfaces being further disposed wherein said moveable surfaces are interconnected to thereby transmit longitudinally-applied forces between the respective surface portions thereof;
   a controllable motor disposed to control motion of one or more of said moveable surfaces wherein a respective one said respective surface portion of the plurality of the moveable surfaces is moved along the longitudinal direction of the vehicle whenever the vehicle is arranged upon the apparatus in the vehicle test configuration;
   a position sensor disposed to detect a longitudinal vehicle position of the vehicle whenever the vehicle is arranged upon the apparatus in the vehicle test configuration;
   wherein the longitudinal vehicle position is the relative longitudinal position of the vehicle whenever disposed with respect to the primary structure whenever the vehicle is arranged upon the apparatus in the vehicle test configuration;
   a controller;
   the position sensor further disposed to deliver a position signal to the controller wherein the position signal indicates the longitudinal vehicle position whenever the vehicle is arranged upon the apparatus in the vehicle test configuration;
   the controller disposed to respond to the position signal by providing a drive signal that is related to the position signal whenever the vehicle is arranged upon the apparatus in the vehicle test configuration;
   the controller further disposed so that whenever the apparatus is combined with the vehicle arranged upon the apparatus in the vehicle test configuration said combination comprises a closed-loop servo control system that controls the drive signal to maintain the vehicle stationary against longitudinal displacement thereof relative to the primary structure; and
   the power measuring device disposed to measure a power wherein the power is delivered by the controllable motor to move the plurality of moveable surfaces while said moveable surfaces are in motion and exposed to a headwind.

2. The apparatus of claim 1, further comprising:
   a combination of the apparatus together with the vehicle arranged upon the apparatus in the vehicle test configuration.

3. The apparatus of claim 2, wherein the vehicle is disposed within a wind tunnel.

4. The apparatus of claim 3, wherein
   a mechanical linkage interconnects two or more of said moveable surfaces.

5. The apparatus of claim 3, wherein
   the plurality of moveable surfaces comprises a cylindrical roller assembly disposed substantially centered beneath a respective one of the wheels of the vehicle.

6. The apparatus of claim 3, wherein the controllable motor comprises a dynamometer.

7. The apparatus of claim 3, wherein the controllable motor comprises a plurality of dynamometers that are each synchronized electrically to provide for synchronous motion of said moveable surfaces.

8. The apparatus of claim 3, wherein the power measuring device is disposed to measure power being delivered through a propulsive wheel of the vehicle.

9. The apparatus of claim 3, wherein the power measuring device is disposed to measure power being delivered by the controllable motor to move the plurality of moveable surfaces.

10. The apparatus of claim 3, wherein the vehicle is an automotive vehicle other than a cycle.

11. The apparatus of claim 2, wherein the controller delivers the drive signal to the controllable motor to thereby control the controllable motor.

12. The apparatus of claim 11, wherein the vehicle is disposed within a wind tunnel.

13. The apparatus of claim 12, wherein the controllable motor comprises a dynamometer.

14. The apparatus of claim 12, wherein the power measuring device is disposed to measure power being delivered by the controllable motor to move the plurality of moveable surfaces.

15. A method for determining propulsive efficiency of wheeled vehicles, comprising:
arranging a terrestrial vehicle to be disposed within a wind tunnel wherein a headwind can be produced;
arranging an apparatus to comprise a primary structure for determining power being delivered through wheels of the vehicle, said vehicle having a plurality of wheels that includes vehicle wheels delivering vehicle propulsive power there-through, whenever the vehicle is arranged upon the apparatus while being operated self-propelled for free longitudinal motion thereof;
arranging the primary structure wherein the primary structure comprises a plurality of moveable surfaces supported thereon;
arranging the vehicle to be disposed upon the plurality of moveable surfaces wherein each said moveable surface is arranged to support a respective one of the vehicle wheels and wherein each said propulsive vehicle wheel is supported thereunder by a respective one of said moveable surfaces and wherein each said moveable surface comprises a respective surface portion of a larger surface with said respective surface portion being in groundward contact with a respective one of the vehicle wheels;
arranging the moveable surfaces to provide for synchronous rotation of the each said propulsive vehicle wheel;
arranging the moveable surfaces to be interconnected to thereby transmit longitudinally-applied forces between the respective surface portions thereof;
arranging the apparatus to further comprise a controllable motor wherein the controllable motor is disposed to control motion of one or more of the moveable surfaces wherein the respective surface portions of the respective moveable surfaces are moved along the longitudinal direction of the vehicle;
arranging the apparatus to further comprise a position sensor wherein the position sensor is disposed to detect a longitudinal vehicle position wherein the longitudinal vehicle position is the relative longitudinal position of the vehicle with respect to the primary structure;
arranging the apparatus to further comprise a controller;
arranging the position sensor to deliver a position signal to the controller wherein the position signal indicates the longitudinal vehicle position;
arranging the controller to respond to the position signal by providing a drive signal that is related to the position signal wherein the drive signal is used to maintain the vehicle stationary against longitudinal displacement of the vehicle relative to the primary structure;
operating the vehicle self-propelled at a test vehicle speed while the wind tunnel is operated at a test headwind speed;
using a power measuring device to measure power; and
measuring power being transmitted between the vehicle and the moveable surfaces using the power measuring device to measure said power.

16. The method of claim 15, further comprising:
arranging the controller wherein a combination of the apparatus and the vehicle comprises a closed-loop servo control system.

17. The method of claim 16, further comprising:
arranging the drive signal to control the controllable motor,
whereby after compensating for any power being utilized solely in moving the moveable surfaces at the test vehicle speed while the vehicle is otherwise absent from the wind tunnel and while the wind tunnel is operated at the test headwind speed, the power measured in moving the moveable surfaces depends on the power being dissipated in drag upon the vehicle while the vehicle is operated at the test vehicle speed with a headwind impinging thereon whose magnitude is equal to the test headwind speed.

18. The method of claim 17, further comprising:
operating the controllable motor to move the moveable surfaces while the wind tunnel is operated at the test headwind speed; and
performing a differential measurement of a power being delivered by the controllable motor to move the moveable surfaces between a first vehicle operating measurement of the delivered motor power and a second apparatus baseline measurement of the delivered motor power wherein the vehicle is disposed upon the moveable surfaces within the wind tunnel while being operated self-propelled at the test vehicle speed in the vehicle operating measurement of the delivered motor power and wherein during the apparatus baseline measurement of the delivered motor power the vehicle is removed from the wind tunnel altogether while the apparatus is operated to move the moveable surfaces at the test vehicle speed and while the wind tunnel is operated at the test headwind speed,
whereby the magnitude of the difference in the delivered motor power between the vehicle operating measurement and the apparatus baseline measurement depends on the power being dissipated in drag upon the vehicle while the vehicle is operated at the test vehicle speed with a headwind impinging thereon whose magnitude is equal to the test headwind speed.

19. The method of claim 17, wherein the vehicle is an automotive vehicle.

20. The method of claim 16, further comprising:
measuring the transmitted power being delivered through at least one of said propulsive vehicle wheels.

21. A method for determining propulsive efficiency of wheeled vehicles, comprising:
arranging a terrestrial vehicle to be disposed within a wind tunnel wherein a headwind can be produced;
arranging an apparatus to comprise a primary structure for determining power being delivered through wheels of the vehicle, said vehicle having a plurality of vehicle wheels, whenever the vehicle is arranged upon the apparatus while being operated self-propelled for free longitudinal motion thereof;
arranging the primary structure wherein the primary structure comprises a plurality of moveable surfaces supported thereon;
arranging the vehicle to be disposed upon the plurality of moveable surfaces wherein each said moveable surface is arranged to support a respective one of the vehicle wheels and wherein each respective one of said vehicle wheels is supported thereunder by a respective one of said moveable surfaces and wherein each said moveable surface comprises a respective surface portion of a larger surface with said respective surface portion being in groundward contact with a respective one of the vehicle wheels;
arranging the moveable surfaces to provide for synchronous rotation of the vehicle wheels;

arranging the moveable surfaces to be interconnected to thereby transmit longitudinally-applied forces between the respective surface portions thereof;

arranging the apparatus to further comprise a controllable motor wherein the controllable motor is disposed to control the motion of one or more of the moveable surfaces wherein at least a respective one said respective surface portion of the moveable surfaces is moved along the longitudinal direction of the vehicle;

arranging the apparatus to further comprise a position sensor wherein the position sensor is disposed to detect a longitudinal vehicle position wherein the longitudinal vehicle position is the relative longitudinal position of the vehicle with respect to the primary structure;

arranging the apparatus to further comprise a controller;

arranging the position sensor to deliver a position signal to the controller wherein the position signal indicates the longitudinal vehicle position;

arranging the controller to respond to the position signal by providing a drive signal that is related to the position signal wherein the drive signal is used to maintain the vehicle stationary against longitudinal displacement of the vehicle relative to the primary structure;

operating the vehicle self-propelled at a test vehicle speed while the wind tunnel is operated at a test headwind speed;

using a power measuring device to measure power; and measuring power being transmitted between the vehicle and the plurality of moveable surfaces using the power measuring device to measure said power.

22. The method of claim 21, further comprising:
arranging the controller wherein a combination of the apparatus and the vehicle comprises a closed-loop servo control system.

23. The method of claim 22, further comprising:
arranging the drive signal to control the controllable motor,
whereby after compensating for any power being utilized solely in moving the moveable surfaces at the test vehicle speed while the vehicle is otherwise absent from the wind tunnel and while the wind tunnel is operated at the test headwind speed, the power measured in moving the moveable surfaces depends on the power being dissipated in drag upon the vehicle while the vehicle is operated at the test vehicle speed with a headwind impinging thereon whose magnitude is equal to the test headwind speed.

24. The method of claim 23, further comprising:
operating the controllable motor to move the moveable surfaces while the wind tunnel is operated at the test headwind speed; and
performing a differential measurement of a power being delivered by the controllable motor to move the moveable surfaces between a first vehicle operating measurement of the delivered motor power and a second apparatus baseline measurement of the delivered motor power wherein the vehicle is disposed upon the moveable surfaces within the wind tunnel while being operated self-propelled at the test vehicle speed in the vehicle operating measurement of the delivered motor power and wherein during the apparatus baseline measurement of the delivered motor power the vehicle is removed from the wind tunnel altogether while the apparatus is operated to move the moveable surfaces at the test vehicle speed and while the wind tunnel is operated at the test headwind speed.

25. The method of claim 24, wherein the vehicle is an automotive vehicle.

* * * * *